(12) United States Patent
Madier et al.

(10) Patent No.: US 11,956,172 B2
(45) Date of Patent: Apr. 9, 2024

(54) TRANSMITTING REFERENCE SIGNAL FOR COEXISTING CELLS

(71) Applicant: NOKIA SOLUTIONS AND NETWORKS OY, Espoo (FI)

(72) Inventors: Louis Madier, Les Ulis (FR); Axel Mueller, Paris (FR); Karsten Petersen, Aalborg (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/971,262

(22) Filed: Oct. 21, 2022

(65) Prior Publication Data

US 2023/0125378 A1 Apr. 27, 2023

(30) Foreign Application Priority Data

Oct. 22, 2021 (FI) ...................................... 20216099

(51) Int. Cl.
*H04L 5/00* (2006.01)
(52) U.S. Cl.
CPC .................................. *H04L 5/0048* (2013.01)
(58) Field of Classification Search
None
See application file for complete search history.

(56) References Cited

U.S. PATENT DOCUMENTS 9,503,966 B2 * 11/2016 Ong ...................... H04W 48/10
9,867,224 B2 * 1/2018 Xu ........................ H04W 76/25
11,523,400 B2 * 12/2022 Guo ...................... H04W 72/085
2011/0205914 A1 * 8/2011 Krishnamurthy ..... G01S 5/0221
370/252
2013/0194950 A1 8/2013 Haghighat et al.
2014/0071891 A1 * 3/2014 Zhou ..................... H04J 11/0069
370/328
2014/0242995 A1 * 8/2014 Lee ....................... H04W 36/38
455/436

(Continued)

FOREIGN PATENT DOCUMENTS

WO 2018/178309 A1 10/2018
WO 2020/065553 A1 4/2020

(Continued)

OTHER PUBLICATIONS

Office Action and Search Report dated May 6, 2022 corresponding to Finnish Patent Application No. 20216099.

(Continued)

*Primary Examiner* — Hassan A Phillips
*Assistant Examiner* — Gautam Sharma
(74) *Attorney, Agent, or Firm* — SQUIRE PATTON BOGGS (US) LLP

(57) ABSTRACT

There is provided generating, at a cell configured for a first air interface protocol, a reference signal based on a cell identifier for a second air interface protocol. At the cell configured for the first air interface protocol it is determined an air interface resource allocation for the first air interface protocol based on the cell identifier for the second air interface protocol. The cell configured for the first air interface protocol transmits the generated reference signal according to the determined air interface resource allocation.

13 Claims, 5 Drawing Sheets

(56) References Cited

U.S. PATENT DOCUMENTS

| | | | | |
|---|---|---|---|---|
| 2015/0016239 A1* | 1/2015 | Yi | H04L 5/0048 370/201 |
| 2015/0043529 A1* | 2/2015 | Kang | H04W 36/14 370/331 |
| 2015/0189531 A1* | 7/2015 | Seo | H04J 11/0053 370/252 |
| 2015/0282036 A1* | 10/2015 | Yi | H04L 5/0048 370/332 |
| 2017/0142743 A1* | 5/2017 | Yoon | H04W 28/26 |
| 2017/0245288 A1* | 8/2017 | Lindoff | H04W 72/541 |
| 2017/0288830 A1* | 10/2017 | Fischer | G01S 5/10 |
| 2018/0110090 A1 | 4/2018 | Um et al. | |
| 2019/0037586 A1* | 1/2019 | Park | H04L 1/0026 |
| 2019/0149383 A1* | 5/2019 | Ko | H04W 72/04 370/329 |
| 2019/0394683 A1* | 12/2019 | Sillanpaa | H04W 36/32 |
| 2020/0021998 A1* | 1/2020 | Baldemair | H04W 16/14 |
| 2020/0367212 A1 | 11/2020 | Maaref et al. | |
| 2022/0038234 A1* | 2/2022 | Frenne | H04L 5/0048 |
| 2022/0086844 A1* | 3/2022 | Rassam | H04L 5/0048 |
| 2022/0182844 A1* | 6/2022 | Park | H04W 4/06 |
| 2022/0385394 A1* | 12/2022 | Rico Alvarino | H04W 72/1289 |

FOREIGN PATENT DOCUMENTS

| | | |
|---|---|---|
| WO | 2020/261095 A1 | 12/2020 |
| WO | 2022/124750 A1 | 6/2022 |

OTHER PUBLICATIONS

Extended European Search Report dated Mar. 14, 2023 corresponding to European Patent Application No. 22201900.2.

Yan Zhu et al., "A Message-Passing Approach for Joint Channel Estimation, Interference Mitigation, and Decoding," IEEE Transactions on Wireless Communications, vol. 8, No. 12, Dec. 2009.

* cited by examiner

TRANSMITTING REFERENCE SIGNAL FOR COEXISTING CELLS

TECHNICAL FIELD

The present invention relates to coexisting transmitting a reference signal by a cell coexisting with another cell according to a different radio interface protocol.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Coexistence of radio systems may be provided by spectrum sharing between the radio systems. With coexisting radio systems, the radio systems may use at least partially the same frequency band. Therefore, some part of a frequency band may be free from interference, while interference may exist on some other part of the frequency band. Therefore, the interference may be imbalanced between different parts of the frequency band, which can cause inaccuracy in channel estimation and measurements over the frequency band and lead to suboptimal link adaptation.

Spectrum sharing can provide coexistence of New Radio and Long Term Evolution networks defined by 3GPP specifications. One way to implement spectrum sharing is static frequency-domain sharing, where a part of the spectrum allocated to Long Term Evolution (LTE) is migrated to New Radio (NR). Another way to implement spectrum sharing is Dynamic Spectrum Sharing (DSS), adopted since Release 15 of the 3GPP specifications, where NR and LTE may dynamically share the same spectrum.

Coexistence of the LTE and NR networks can cause interference from NR to LTE or vice versa. Cell Reference Signal Rate Matching (CRS-RM), specified in Release 15 and Release 16 of the 3GPP NR specifications, can be used to mitigate interference. LTE cells transmit Cell Reference Signals (CRSs) using a fixed assignment of Resource Elements (REs) defined in time-frequency -domain resources. REs for CRS, or CRS REs, are regularly spaced in frequency domain and in four to six slots in every subframe depending on a number of antenna ports used for CRSs. In CRS-RM, REs carrying LTE CRS are punctured and Physical Downlink Shared Channel of the NR is rate matched around the punctured REs. When puncturing is used at an NR cell in accordance with CRS-RM, the NR cell does not transmit on the punctured REs. Therefore, CRS-RM protects the NR Physical Downlink Shared Channel (PDSCH) from LTE CRS and LTE CRS from NR PDSCH. However, from the LTE perspective only the CRS transmissions are protected, whereby REs used for user data experience interference from NR. This interference pattern mismatch causes wrong channel quality evaluations by the LTE UE for its data carrying REs. This can result in suboptimal link adaptation and decreased demodulation performance in the LTE system.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect there is provided a method comprising: generating, at a cell configured for a first air interface protocol coexisting with at least one cell configured for a second air interface protocol, a reference signal based on a cell identifier for the second air interface protocol;
  determining, at the cell configured for the first air interface protocol, an air interface resource allocation for the first air interface protocol based on the cell identifier for the second air interface protocol; and
  transmitting, by the cell configured for the first air interface protocol, the generated cell reference signal according to the determined air interface resource allocation.

According to a second aspect there is provided an apparatus comprising: means for generating, at a cell configured for a first air interface protocol coexisting with at least one cell configured for a second air interface protocol, a reference signal based on a cell identifier for the second air interface protocol;
  means for determining, at the cell configured for the first air interface protocol, an air interface resource allocation for the first air interface protocol based on the cell identifier for the second air interface protocol; and
  means for transmitting, by the cell configured for the first air interface protocol, the generated cell reference signal according to the determined air interface resource allocation.

According to a third aspect there is provided an apparatus comprising: one or more processors, and memory storing instructions that, when executed by the one or more processors, the apparatus is caused to:
  generate, at a cell configured for a first air interface protocol coexisting with at least one cell configured for a second air interface protocol, a reference signal based on a cell identifier for the second air interface protocol;
  determine, at the cell configured for the first air interface protocol, an air interface resource allocation for the first air interface protocol based on the cell identifier for the second air interface protocol; and
  transmit, by the cell configured for the first air interface protocol, the generated cell reference signal according to the determined air interface resource allocation.

According to a fourth aspect there is provided computer program comprising computer readable program code means adapted to perform at least the following:
  receiving, by a receiver wireless device, a groupcast, from a transmitter wireless device of the groupcast;
  generate, at a cell configured for a first air interface protocol coexisting with at least one cell configured for a second air interface protocol, a reference signal based on a cell identifier for the second air interface protocol;
  determine, at the cell configured for the first air interface protocol, an air interface resource allocation for the first air interface protocol based on the cell identifier for the second air interface protocol; and
  transmit, by the cell configured for the first air interface protocol, the generated cell reference signal according to the determined air interface resource allocation.

According to a fifth aspect there is provided non-transitory computer readable medium comprising program instructions for causing an apparatus to perform at least the following:

generate, at a cell configured for a first air interface protocol coexisting with at least one cell configured for a second air interface protocol, a reference signal based on a cell identifier for the second air interface protocol;

determine, at the cell configured for the first air interface protocol, an air interface resource allocation for the first air interface protocol based on the cell identifier for the second air interface protocol; and transmit, by the cell configured for the first air interface protocol, the generated cell reference signal according to the determined air interface resource allocation.

One or more of the above aspects may comprise at least some of the following features of the following list:

determining, at the cell configured for the first air interface protocol, the resource allocation based on reserving resource elements for the generated cell reference signal.

transmitting, by the cell configured for the first air interface protocol, the generated cell reference signal on the reserved resource elements.

rate-matching, at the cell configured for the first air interface protocol, user data to user equipment of the cell configured for the first air interface protocol to resource elements adjacent to the resource elements reserved for the generated cell reference signal.

determining, at the cell configured for the first air interface protocol, the cell identifier configured for the second air interface protocol based on at least one of a signalling procedure with one or more cells configured for the second air interface protocol;

signalling procedure with a centralized network entity for distributing cell-specific cell identifiers;

a configuration determined by an Operations and Maintenance system; and information of used cell identifiers by the one or more cells configured for the second air interface protocol;

determining, at the cell configured for the first air interface protocol, the air interface resource allocation based on information indicating a cell reference signal allocation of at least one cell configured for the second air interface protocol.

the first air interface protocol is New Radio (NR) and the second air interface protocol is Long Term Evolution (LTE) and the cell identifier is physical cell identifier for LTE.

At least some embodiments facilitate interference mitigation between different air interface protocols that coexist on the same air interface resources.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

Figure 1:
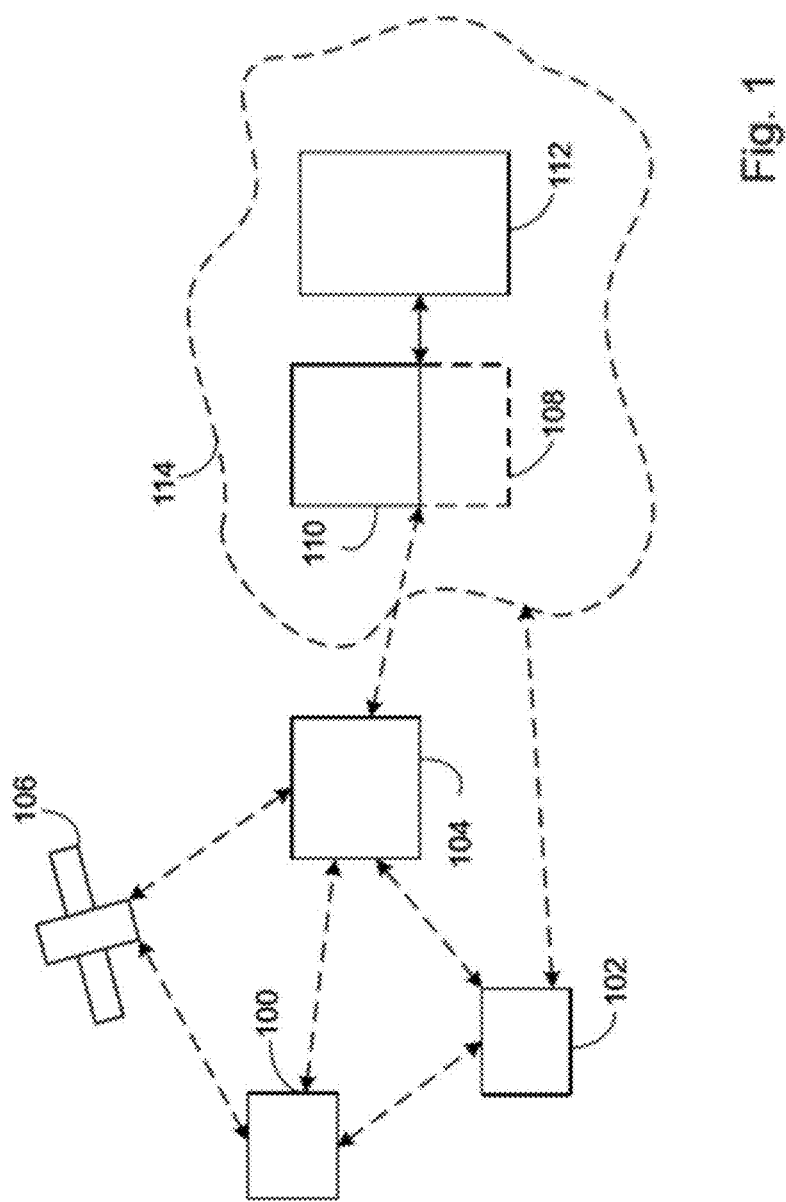
FIG. 1 shows a part of an exemplifying wireless communications access network in accordance with at least some embodiments of the present invention.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Use of ordinal terms such as "first," "second," "third," etc., in the claims and description to modify a described feature does not by itself connote any priority, precedence, or order of one described feature over another or the temporal order in which acts of a method are performed, but are used merely as labels to distinguish one described feature having a certain name from another described feature having a same name (but for use of the ordinal term) to distinguish the described feature.

There is provided generating, at a cell configured for a first air interface protocol, a reference signal based on a cell identifier for a second air interface protocol. At the cell configured for the first air interface protocol it is determined an air interface resource allocation for the first air interface protocol based on the cell identifier for the second air interface protocol. The cell configured for the first air interface protocol transmits the generated reference signal according to the determined air interface resource allocation. Since the cell identifier for the second air interface protocol is used to determine the air interface resource allocation for the first air interface protocol and to generate the cell reference signal, receivers for the second air interface protocol may locate the reference signal from transmissions of the cell configured for the first air interface protocol, identify the reference signal to be compatible with the second air interface protocol and use the reference signal for various measurements for example channel estimation and estimation of interference+noise variation. In this way interference mitigation between different air interface protocols that coexist on the same air interface resources, is enabled in a mutually compatible manner.

A cell identifier may be a physical layer identity of a cell, i.e. a physical cell identifier (Physical Cell ID). The Physical Cell ID may be for an LTE radio interface. The physical cell identifier may be used to generate a resource grid comprising REs for Cell Reference Signal (CRS). Accordingly, RE locations for the cell specific reference signal (CRS) is influenced by Physical Cell ID. Additionally, the Physical Cell ID may be used for generating a pseudo random sequence for scrambling downlink signal transmitted by a cell, e.g. NR cell or LTE cell.

Air interface protocol refers to a communications protocol for communications devices over an air interface. The air interface protocol may be a physical layer protocol. The air interface protocol may be a part of an air interface protocol stack according to a radio interface technology, for example an LTE radio interface or a New Radio (NR) radio interface. The physical layer protocol converts transport channels from a higher protocol layer medium into a physical signal that is transmitted over a physical medium, i.e. the air interface. The air interface protocol defines physical layer resources, or resource elements (REs), positions of the resources, and content of the resources on a physical medium, i.e. the air interface. The REs may be defined in time-frequency-domain. An example of time-frequency-domain definition, an RE may be defined by a combination of a subcarrier frequency and symbol number. Examples of the air interface protocols comprise LTE and NR defined by the 3GPP specifications. NR is also known as 5G NR or 5G. LTE is also known as E-UTRAN (Evolved Universal Terrestrial Access Network), it's further development is known as LTE-Advanced. In an example of content of the resources, the physical layer protocol may define REs for one or more synchronization signals and reference signals over an air interface. Synchronization signals are physical layer signals and they need to be identified by a UE accessing a cell of a radio network. In LTE, synchronization signals are located in the centre of the carrier bandwidth; which makes them easy to find. In 5G NR, the sync signals are part of a Synchronization Signal/Physical Broadcast channel (SS/PBCH) block (also called synchronization signal block, SSB). These SS/PBCH blocks can be located at multiple positions all over the carrier bandwidth and are broadcast periodically as defined symbols in the radio frames and different beams versus time. Reference signals are physical layer signals used for measuring received signal power. In LTE a cell specific reference signal (CRS) is used to deliver UE a reference point for downlink power. CRS is carried by multiples of specific Resource Elements in each slot and the location of the resource elements are specifically determined by antenna configuration.

It should be noted that although some embodiments are described with examples that refer to LTE and NR as coexisting air interface protocols, the examples may be applied also to other air interface protocols.

An air interface resource allocation for air interface protocol, or also referred to a resource allocation in the following, may comprise physical layer resources, or resource elements (REs) and positions of the resources on a physical medium, i.e. the air interface. In an example the resource allocation may be a resource grid. The resource allocation may comprise data REs for communications of downlink and/or uplink user data, and REs for carrying CRS, i.e. CRS REs. Examples of the data REs may comprise REs carrying Physical Downlink Shared Channel (PDSCH) traffic. Coexisting radio systems, e.g. the NR and LTE, may have at least partially colliding resource allocations. Accordingly, REs of the resource allocations define at least partially overlapping resources on the air interface, whereby the resource allocations have colliding REs. In accordance with at least some embodiments, when radio systems, e.g. an NR cell and an LTE cell, coexist, resource elements at an interfering radio system, e.g. the NR cell, may be reserved for transmission of a reference signal, or a virtual reference signal, for the other radio system, e.g. the LTE. The virtual reference signal may be known to the UE, e.g. the virtual reference signal may be an LTE CRS know by LTE UE. The virtual reference signal transmitted by the interfering radio system enables UE served by the interfered radio system to improve Interference+noise estimation and at the same time mitigate interference (remove) from the interfering radio system to colliding REs. It should be note that proper interference+noise estimation is also possible with random data or duplication of REs in place of the virtual reference signal.

Rate matching of user data, e.g. a transport block (TB) containing user data for PDSCH, refers to the process of choosing the TB size, or coded bits, to match the available resources for transmission (subject to modulation and coding rate constraints). The definition of available resources for transmission takes into account reserved resources in the time/frequency resource grid allocated to carry the user data. The symbols carrying useful information, created by the modulation process, are then allocated to the time/frequency grid resources allocated to a user, and rate-matched around reserved REs/resources/signals.

It should be noted that in the following the term "virtual" in the claims and description is used to modify a described feature as a label to distinguish the described features from one another and to help in distinguishing the novel features of the described embodiments. For example, a virtual RE, e.g. virtual CRS RE, may refer to a RE reserved and used for transmission of a virtual reference signal. For example, a virtual reference signal, e.g. virtual CRS or virtual LTE CRS, may be reference signal according to one air interface protocol, e.g. LTE, but transmitted by another air interface protocol, e.g. NR. The virtual reference signal enables a cell, e.g. NR cell, to appear to a receiver device, e.g. LTE UE served by an LTE cell, as a cell of another air interface protocol, e.g. LTE. For example, a virtual cell identifier, e.g. a virtual PCI or a virtual LTE PCI, may refer to cell identifier, e.g. a PCI, that is used for determining a virtual reference signal. FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage. The access node provides access by way of communications of radio frequency (RF) signals and may be referred to a radio access node. It should be appreciated that the radio access network may comprise more than one access nodes, whereby a handover of a wireless connection of the user device from one cell of one access node, e.g. a source cell of a source access node, to another cell of another node, e.g. a target cell of a target access node, may be performed.

A communication system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point, access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, wireless device, communications device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave -mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks may be fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably will be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have access to a plurality of radio cells and the system may comprise also other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); a distributed unit (DU) that may be used for the so-called Layer 1 (L1) processing and real-time Layer 2 (L2) processing; and a centralized unit (CU) or a central unit that may be used for non-real-time L2 and Layer 3 (L3) processing. Such a split may enable the centralization of CUs relative to the cell sites and DUs, whereas DUs may be more distributed and may even remain at cell sites. The CU and DU together may also be referred to as baseband or a baseband unit (BBU). The RU and DU may also be comprised into a radio access point (RAP). Cloud computing platforms may also be used to run the CU or DU. The CU may run in a cloud computing platform (vCU, virtualized CU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

An open radio access network, O-RAN, as defined by the Open RAN Alliance, refers to a concept enabling interoperability of RAN elements between different vendors over a set of defined interfaces. Thus, O-RAN architecture for example enables baseband unit and radio unit components from different vendors to operate together. While Cloud RAN and Open RAN (ORAN or O-RAN) may have ties and may often be discussed together, they may also be considered as different technologies and one can be applied without the other. Open RAN for example defines open interfaces between network elements, while Cloud RAN for example may virtualize the baseband and separate baseband hardware and software.

Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometres, or smaller cells such as micro-, femto- or picocells or so called small cells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, a concept of "plug-and-play" (e/g)NodeBs may also be introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2A:
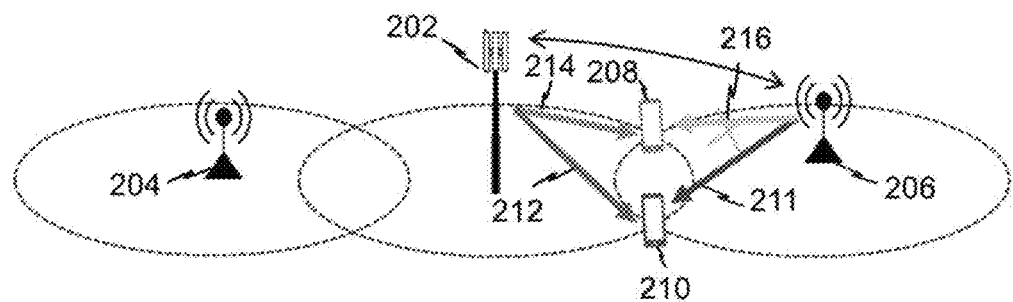
FIG. 2a illustrates an example of coexistence of LTE and NR in accordance with at least some embodiments.

FIG. 2a illustrates coexistence of LTE and NR in accordance with at least some embodiments. NR gNB 202 is configured to operate on the same frequency band, e.g. an LTE band at 2.1 GHz, with one or more LTE eNBs 204,206, whereby resource allocations of the NR gNB and LTE eNBs may at least partially overlap. In the illustrated example, UE 208, is served by a cell, NR cell, provided by the gNB and another UE 210 is served by a cell, LTE cell, provided by the eNB 206. The UE 208 served by the NR cell may be referred to NR UE and the UE 210 served by the LTE cell may be referred to LTE UE. The UEs are located at cell edges of the NR cell and LTE cell. In this location, the LTE UE may experience interference from the NR cell and the NR UE may experience interference from the LTE cell. In the example illustrated in FIG. 2a, the LTE UE is served over a serving link 211 to the LTE cell and receiving CRS transmissions according to a resource allocation performed at the LTE cell. However, the LTE UE is also receiving interference from the NR cell over an interference pattern link 212, since the interference pattern link may have colliding resource elements with the serving link of the LTE UE. In another example illustrated in FIG. 2a, the NR UE is connected over a punctured serving link 214 to the NR cell and receiving PDSCH data that has been rate-matched at the NR cell to REs that are around, or adjacent to, REs of the NR cell colliding with CRS REs of the LTE cell over the serving link 211. Accordingly, positions of the CRS REs of the LTE cell have been used at the NR cell for puncturing the resource allocation of the NR cell at REs that are colliding with the CRS REs. Additionally, rate-matching has been used at the NR cell for enabling the NR UE 208 to receive NR PDSCH from the NR cell without receiving the punctured REs. Since the PDSCH data is rate-matched around or adjacent to, the punctured REs, the CRS 216 from the LTE cell do not interfere with the PDSCH data from the NR cell. It should be noted that in the illustrated scenario of FIG. 2a, it is possible that the LTE UE and the NR UE are positioned such that the NR cell may cause interference to CRS of one or more further LTE cells that may be provided by the same or different eNBs 204,206. In such case, the NR may puncture REs of the NR cell colliding with CRS REs of the one or more further cells from its resource allocation. In this way also CRS from the further LTE cells do not interfere with the PDSCH data from the NR cell. On the other hand, when the NR cell punctures REs that collide with any of the CRS REs of LTE cells, interference from the NR cell is mitigated. The puncturing may be performed based on a rate-matching (RM) algorithm by a scheduler of the gNB. The RM may target on puncturing the CRS REs of the LTE cells to avoid interference to reception of the CRSs at UE. It should be noted that the NR gNB may be connected over X2/Xn interfaces for Network Assisted Interference Cancellation and Suppression (NAICS) and Rate-Matching with the LTE eNB(s) 204,206. In this way at least information indicating cell reference signal allocations of the LTE cells may be communicated to the NR gNB for puncturing and rate-matching the CRSs. Examples of information indicating the cell reference signal allocations comprise at least a symbol number and a subcarrier. The NAICS is supported by LTE Release 12 specifications. In NAICS the serving eNB shares information about an interfering signal from the surrounding eNBs with its UEs and in turn these UEs may cancel and suppress the interfering signal using the shared information.

It should be noted that the puncturing performed at the NR cell may result in an interference pattern mismatch between REs used for data transmission and channel estimation, and cause demodulation performance degradation on the LTE UE side. In order to mitigate this, in an example in accordance with at least some embodiments, the punctured resource elements at the NR cell, may be used for transmission of LTE CRS, or virtual LTE CRS. The virtual LTE CRS transmitted by the NR cell enables an LTE UE served by the LTE cell to mitigate NR interference to REs of the LTE cell from colliding REs of the NR cell. Where mitigation can refer to at least mitigation of interference pattern mismatch, and mitigation of interference in the demodulation of colliding REs.

Figure 2B:
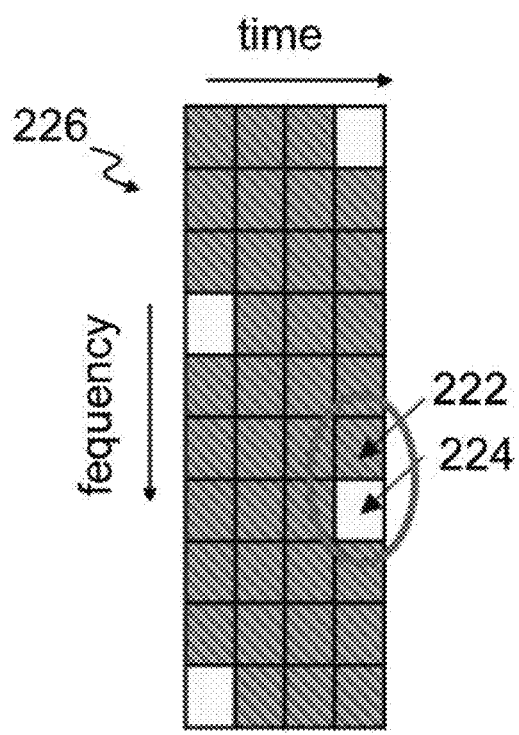
FIG. 2b illustrates an example of a resource allocation for coexisting LTE and NR in accordance with at least some embodiments.

FIG. 2b illustrates a resource allocation for coexisting LTE and NR in accordance with at least some embodiments. The resource allocation is described with reference to both FIG. 2a and FIG. 2b. The resource allocation is illustrated by a resource grid 226 comprising REs in frequency-time -domain. The resource grid may illustrate a resource allocation on the punctured serving link 214. The REs comprise virtual CRS REs 224 that are REs colliding with CRS REs of the LTE cell and REs 222 that are around, or adjacent to, the virtual CRS REs. The virtual CRS REs are reserved for transmission of a virtual LTE CRS by the NR cell. In this way the virtual CRS REs are seen by the LTE UE served by the LTE cell provided by the eNB 206 as CRS from a neighbouring LTE cell and the LTE UE may use the CRS for mitigating interference from the NR cell to LTE REs that are colliding with NR REs.

Figure 3:
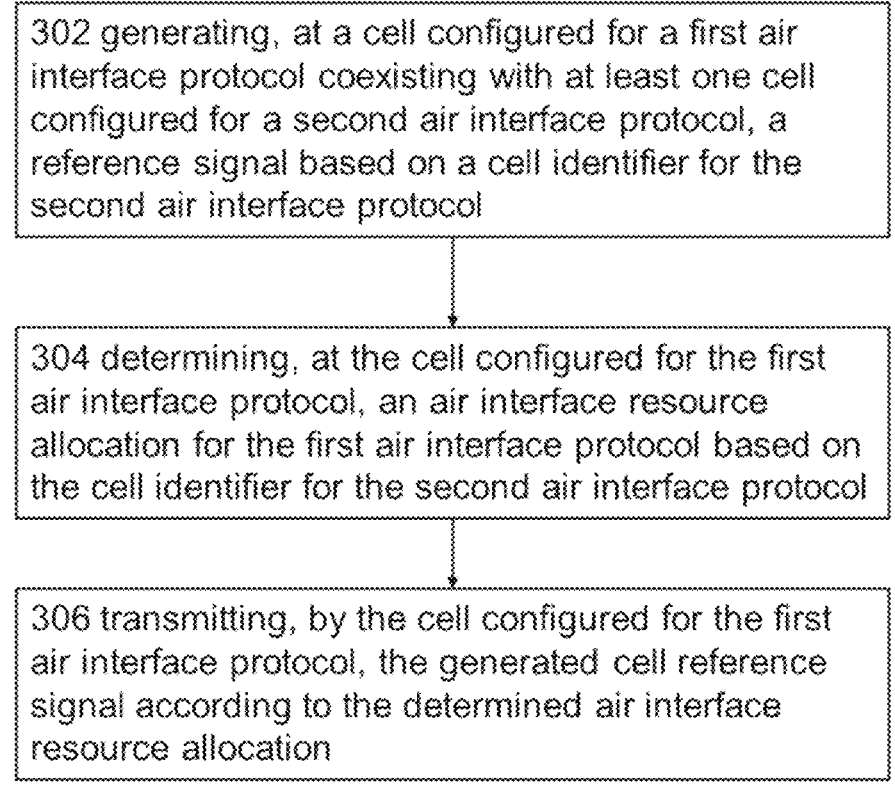
FIG. 3 illustrates an example of a method in accordance with at least some embodiments.

FIG. 3 illustrates an example of a method in accordance with at least some embodiments. The method provides interference mitigation between different air interface protocols that coexist on the same air interface resources. The example may be performed by at an interfering transmitter for example a scheduler or a gNB for enabling LTE and NR coexistence. Phase 302 comprises generating, at a cell configured for a first air interface protocol coexisting with at least one cell configured for a second air interface protocol, a reference signal based on a cell identifier for the second air interface protocol. Phase 304 comprises determining, at the cell configured for the first air interface protocol, an air interface resource allocation for the first air interface protocol based on the cell identifier for the second air interface protocol. Phase 306 comprises transmitting, by the cell configured for the first air interface protocol, the generated cell reference signal according to the determined air interface resource allocation.

In an example, in phase 302, the first air interface protocol is NR and the second air interface protocol is LTE. The reference signal, LTE CRS, is generated, at an NR cell, based on an LTE PCI. The LTE CRS is transmitted on REs of the NR cell. The NR REs for the LTE CRS are determined based on CRS pattern used by LTE cell. In this way the NR cell appears to LTE UE served by the LTE cell as an interfering LTE cell and the LTE UE may mitigate interference from the NR cell. This enables improving accuracy of interference estimation, channel estimation, and measurements for LTE.

In an example, phase 304 comprises rate-matching, at an NR cell, PDSCH data to NR UE to REs adjacent to REs reserved for virtual LTE CRS. The REs reserved for virtual LTE CRS may be punctured.

It should be noted that, in phase 306, since the interfering transmitter, e.g. NR cell, uses the cell identifier for a second air interface protocol to generate the reference signal and determine a resource allocation, the cell reference signal transmitted from the interfering transmitter may appear to a receiver, e.g. a UE, as a cell according to the second air interface protocol.

It should be noted that, in phase 302, since the generated cell reference signal is configured for a different air interface protocol than the interfering transmitter, e.g. NR cell, the generated cell reference signal may be referred to a virtual reference signal and the interfering cell may be a virtual cell of the second air interface protocol, e.g. virtual LTE cell. Based on the virtual reference signal, the receiver, e.g. LTE UE, may determine power of the reference signal and apply the interference mitigation techniques defined e.g. in LTE (for example using the LTE NAICS framework). Referring to an example of interference mitigation in LTE, two types of receivers can be envisioned for LTE UE. In both receivers, the LTE UE can estimate the noise+Interference variance in addition to the channel:

(1) Interference Cancellation (IC) type 1 receiver where the channel response is estimated sequentially where the neighbour cell channel is estimated first followed subtracting the estimated neighbour cell signal from the received signal and this is followed by serving cell channel estimation.

(2) IC type 2 receiver where joint channel estimation methods such as Minimum Mean-Squared Estimation (MMSE) or Maximum Likelihood Estimation (MLE) or Least-Squares Estimation (LSE), DFT-based Channel Estimation, or Message-Passing Approach are used. The message passing approach is described in Yan Zhu and all "A Message-Passing Approach for Joint Channel Estimation, Interference Mitigation, and Decoding", IEEE TRANSACTIONS ON WIRELESS COMMUNICATIONS, VOL. 8, NO. 12, DECEMBER 2009.

An example of received signal at the LTE UE coming from one serving LTE cell and one NR interfering cell may be written as $$y_i = h_i P_i + \beta h_{I,i} P_{I,i} + n_i, \ i=1, \ldots, N_{CRS},$$

where:

$h_i$ is the complex channel coefficient between the serving LTE cell and the LTE UE (contains fading, path loss, etc.)

$P_i$ is the LTE QPSK transmit pilot symbol sent using the LTE base station energy per resource element (EPRE),
$n_i$ is the additive noise,
β CRS/Data RE power ratio; usually 1,
$N_{CRS}$ is the total number of CRS REs in an LTE subframe,
$h_{I,i}$ is the complex channel coefficient between the interfering NR cell and the LTE UE,
$P_{I,i}$ is the CRS ("pilot") of the virtual LTE cell (transmitted from interfering NR cell using the NR base station energy per resource element used for PDSCH channel). The LTE UE can generate internally $P_{I,i}$ if it knows the parameters of the interfering NR cell.

Then, the LTE UEs interfered by the virtual LTE cell may improve their channel estimation. For example, for an IC receiver type 1 the channel estimate can be written as $$\hat{h}_i = P_i^*(\underbrace{y_i - \hat{\beta}\hat{h}_{I,i}P_{I,i}}_{\text{interferer channel is estimated first then removed}}) = h_i + P_i^*(\hat{\beta}\hat{h}_{I,i}P_{I,i} - \hat{\beta}\hat{h}_{I,i}P_{I,i}) + P_i^* n_i,$$

where the UE first estimated the channel for the interferer $\widehat{\beta h}_{I,i}$ then remove the estimated interfering signal $\widehat{\beta h}_{I,i}P_{I,i}$ from the received signal $y_i$, then apply zero forcing channel estimation (multiplication by $P_i^*$) to obtain the channel coefficient.

Finally, The LTE UEs can estimate the variance of noise+Interference as

Var(noise+Interference)=Var($y_i - \hat{h}_i P_i$)

Consequently, the method facilitates the IC capable LTE UEs to have an accurate estimation of the channel coefficients of the interfere $\widehat{\beta h}_{I,i}$ and an accurate estimation of the serving cell channel $\hat{h}_i$ which leads to a more accurate estimation of the noise+interference variance.

In an example according to at least some embodiments, phase 304 comprises determining, at the cell configured for the first air interface protocol, the resource allocation based on reserving resource elements for the generated cell reference signal; and transmitting, by the cell configured for the first air interface protocol, the generated cell reference signal on the reserved resource elements. In an example, a NR cell may transmit an LTE CRS on reserved REs. The LTE CRS may be referred to a virtual LTE CRS since it is transmitted by the NR cell. Therefore, the virtual LTE CRS is an LTE compliant signal, that is in accordance/compliant with rules set in the current LTE network. The reserved REs may be punctured REs or defined based on rate-matched REs, whereby an LTE UE may receive PDSCH data from REs around the reserved REs. It should be noted that punctured REs are not taken into account in calculation of Transport Block size, while rate-matched REs are.

In an example, phase 304 comprises that the resource elements for the generated cell reference signal may be reserved to the resource allocation for the first air interface protocol based on the cell identifier for the second air interface protocol. The cell identifier may determine on which resource elements of the resource allocation, or resource grid, the cell reference signal is transmitted. In an example, the cell identifier for the second air interface protocol may be an LTE PCI and the LTE Physical cell identifier is used to determine on which REs an LTE CRS is transmitted. Since the LTE CRS is transmitted by an interfering radio system, e.g. by an NR cell, the LTE CRS may be referred to a virtual LTE CRS.

In an example, in phase 304, the resource elements for the generated reference signal may be reserved based on puncturing the reserved resource elements and rate-matching user data to resource elements adjacent to the punctured resource elements. Puncturing pattern for the resource elements may be determined based on the generated cell reference signal. It should be noted that the puncturing pattern may be specific to a number of antenna ports for the resource elements at the first cell. The rate-matched resource elements carrying user data may be received by UE served by the cell according to the first air interface protocol, while UE served by the cell according to the second air interface protocol may receive the generated reference signal. In this way the cell according to the first air interface protocol appears to the UE as a cell according to the second air interface protocol. Since the cell reference signal is according to the second air interface protocol, the UE may use the cell reference signal for interference mitigation from the first cell.

In an example according to at least some embodiments, phase 304 comprises rate-matching, at the cell configured for the first air interface protocol, user data to user equipment of the cell configured for the first air interface protocol to resource elements adjacent to the resource elements reserved for the generated cell reference signal. Since the user data is rate-matched to the adjacent resource elements, the resource elements reserved for the generated cell reference signal are declared not to be used for transmission of data to UE served by the cell configured for the first air interface protocol. In an example the rate-matching may be performed by puncturing or repeating transport channel data bits, e.g. PDSCH data bits, around, or adjacent to, the resource elements, e.g. virtual LTE CRS REs, reserved for the generated cell reference signal.

In an example according to at least some embodiments, phase 302 comprises determining, at the cell configured for the first air interface protocol, the cell identifier configured for the second air interface protocol based on at least one of
 signalling procedure with a centralized network entity for distributing cell-specific cell identifiers;
 a configuration determined by an Operations and Maintenance system; and
 information of used cell identifiers by the one or more cells configured for the second air interface protocol.

In an example, phase 302 comprises that the signalling procedure with the centralized network entity may comprise a request for the cell identifier configured for the second air interface protocol from the cell configured for the first air interface protocol, or a base station hosting the cell, to the centralized network entity. Preferably, the centralized network entity may determine a cell identifier configured for the second air interface protocol that is not assigned to any of the cells configured for the second air interface protocol and send the determined cell identifier in response to the request. In this way the cell identifier configured for the second air interface protocol may be different than any of the cell identifiers already assigned to the cells configured for the second air interface protocol. In an example the signalling procedure may be performed over X2/Xn interfaces.

In an example, phase 302 comprises that the information of used cell identifiers by the one or more cells configured for the second air interface protocol may be obtained based on receiving information indicating used cell identifiers, or used cell identifiers, from one or more cells configured for the second air interface protocol. In this way the cell identifier configured for the second air interface protocol may be determined to be different than any of the used cell identifiers for the second air interface protocol. In an example the information of used cell identifiers may be received over X2/Xn interfaces.

In an example, phase 302 comprises that the information indicating used cell identifiers may be received by a signalling procedure between the cell configured for the first air interface protocol and one or more cells configured for the second air interface protocol. In an example the signalling procedure may be performed over an X2/Xn interface.

In an example, phase 302 comprises that the information indicating used cell identifiers received at the cell configured for the first air interface protocol may be used for building a list of used cell identifiers for the second air interface protocol and determining the cell identifier configured for the second air interface protocol based on the list. Then, the cell identifier configured for the second air interface protocol may be determined to be a cell identifier not included to the list.

In an example, phase 302 comprises that the configuration determined by an Operations and Maintenance system may be performed by an operator. The OAM may be connected to a base station hosting the cell, whereby the operator may configure the cell identifier for the second air interface protocol manually via user interface of the OAM.

In an example according to at least some embodiments, phase 302 comprises determining, at the cell configured for the first air interface protocol, the air interface resource allocation based on information indicating a cell reference signal allocation of at least one cell configured for the second air interface protocol. In an example, the information indicating a cell reference signal allocation may indicate a mapping of the cell reference signal according to the second air interface protocol.

Figure 4:
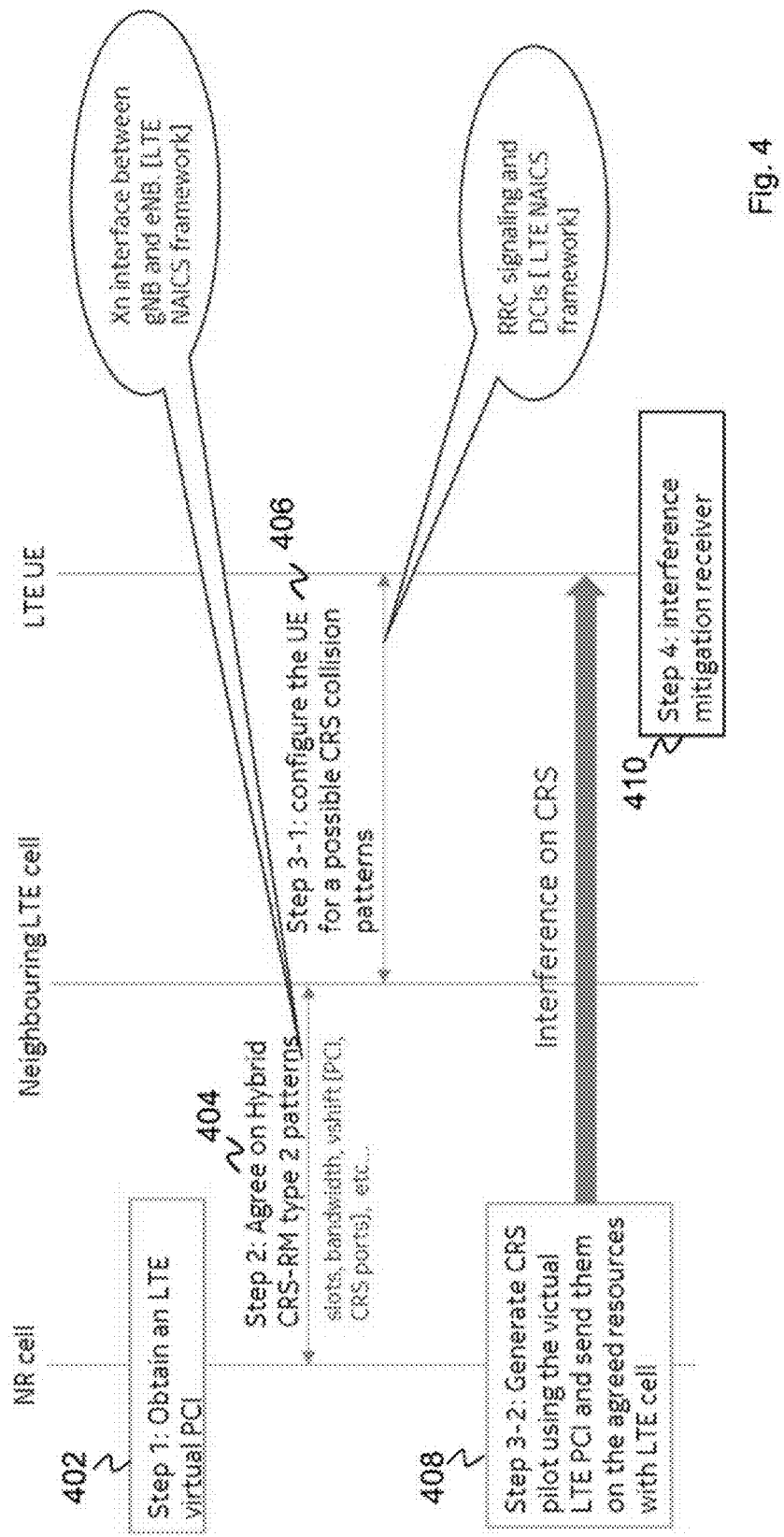
FIG. 4 illustrates an example of a sequence in accordance with at least some embodiments of the present invention.

FIG. 4 illustrates a sequence in accordance with at least some embodiments. The sequence may be performed by a gNB for enabling LTE and NR coexistence described with FIG. 2. The sequence is described in accordance with the phases of the method described in FIG. 3, the first air interface protocol is New Radio (NR) and the second air interface protocol is Long Term Evolution (LTE) and the cell identifier is Physical cell identifier for LTE. It should be noted that the LTE cell may be the same cell as the NR cell if DSS is used.

Phase 402 comprises obtaining, at an NR cell, a Physical Cell Identifier (PCI) for LTE, or virtual LTE PCI. The PCI may referred to a virtual LTE PCI, since it is used by the NR cell to determine a virtual LTE CRS and REs, in accordance with the method described in FIG. 3. The virtual LTE PCI may be determined based on at least one of:
- signalling procedure with a centralized network entity for distributing cell-specific cell identifiers;
- a configuration determined by an Operations and Maintenance system; and
- information of used cell identifiers by the one or more cells configured for the second air interface protocol.

In an example, phase 402 comprises that the virtual LTE PCI may have the same vshift value as the one or more coexisting LTE cells. The vshift defines a cell-specific frequency shift of the CRS for mapping of CRS to REs and is defined in 3GPP TS 36.211 as follows:
- The cell-specific frequency shift is given by $v_{shift}=N_{ID}^{cell}$ mod 6.
- Therefore, the virtual LTE PCI of the NR cell can be chosen to any value as long as it gives the same vshift of the serving LTE cell.

Phase 404 comprises the NR cell and an LTE cell agree on resource allocation patterns. As a result, a collision pattern of CRS REs and REs of the NR cell is determined. In an example, the NR cell and LTE cell agree on slots, bandwidth, vshift [PCI mod 6], CRS ports, etc.

In an example, the resource allocation pattern of the LTE cell indicates positions of CRS REs. The positions of the CRS REs may be used to reserve REs at the same positions in the resource allocation pattern for the NR. In an example, the phase 404 may be performed based on a signalling procedure over X2/Xn interfaces between the gNB providing the NR cell and the eNB providing the LTE cell.

Phase 406 comprises configuring one or more LTE UE for the collision pattern. In this way the LTE UE may know the positions of the CRSs from the LTE cell and use the CRSs e.g. for channel estimation. LTE NAICS framework may be used for configuring the UE.

Phase 408 comprises that the NR cell generates and sends CRS, or virtual LTE CRS, using the virtual LTE PCI at the same REs as the LTE cell is using for the CRSs. Thus, in accordance with the collision pattern known to the LTE UE. Accordingly, the NR cell may use the determined collision pattern for determining resource allocations for sending the CRS. Accordingly, phase 408 may comprise generating a virtual CRS, determining resource grid comprising the virtual CRS and transmitting the virtual CRS in accordance with phases 302 to 306.

Phase 410 comprises applying interference mitigation at the LTE UE. The UE may have an IC type 1 or IC type 2 receiver. In an example the LTE UE that has an IC type 2 receiver may Improve its channel estimation by jointly estimating its own channel $h_i$ and the interferer channel $\beta\widehat{h_{I,i}}$. In an example the LTE UE may estimate the noise+interference variance which accurately reflects the real noise+interference value on data REs and uses it for Link Adaptation/Channel Quality Indicator (LA/CQI) feedback. It should be noted that Effective interference power for CQI feedback calculation is dependent on the interference mitigation capabilities of the LTE UE. Effective interference might be close to zero for very advanced interference cancellation receivers.

Figure 5:
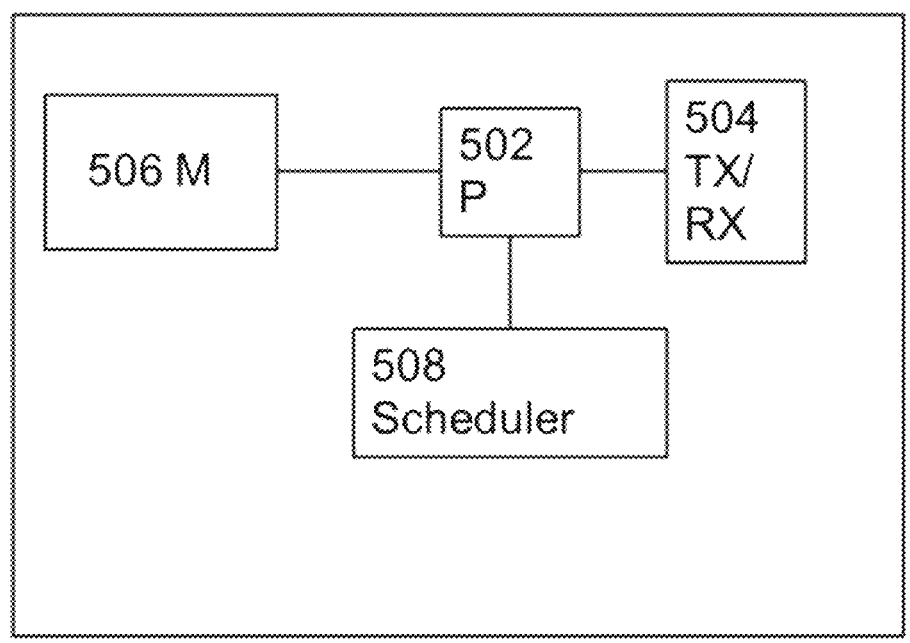
FIG. 5 illustrates a block diagram of an apparatus in accordance with at least some embodiments.

FIG. 5 illustrates an example of an apparatus in accordance with at least some embodiments of the present invention. The apparatus may be a base station, e.g. a gNB or a part of a base station. The apparatus may host a cell in accordance with an air interface protocol for providing wireless access to UE within a coverage area of the apparatus.

The apparatus comprises a processor 502 and a transceiver 504. The processor is operatively connected to the transceiver for controlling the transceiver. The apparatus may comprise a memory 506. The memory may be operatively connected to the processor. It should be appreciated that the memory may be a separate memory or included to the processor and/or the transceiver.

In an example, the apparatus comprises a scheduler 508 connected operatively to the processor. The scheduler may be configured to perform one or more functionalities described in an example described herein, comprising generating a reference signal, determining an air interface resource allocation, transmitting a reference signal according to an air interface resource allocation and causing one or more of the previous.

According to an embodiment, the processor is configured to control the transceiver and/or to perform one or more functionalities described with a method according to an embodiment.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, program instructions, instructions, computer code etc. should be understood to express software fora programmable processor firmware such as the programmable content of a hardware device as instructions for a processor or configured or configuration settings for a fixed function device, gate array, programmable logic device, etc.

Although the above examples describe embodiments of the invention operating within a wireless device or a wireless network, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
(i) a combination of analogue and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
generating, at a cell configured for a first air interface protocol coexisting with at least one cell configured for a second air interface protocol, a reference signal based on a cell identifier for the second air interface protocol;
determining, at the cell configured for the first air interface protocol, an air interface resource allocation for the first air interface protocol based on the cell identifier for the second air interface protocol;
transmitting, by the cell configured for the first air interface protocol, the generated cell reference signal according to the determined air interface resource allocation; and
determining, at the cell configured for the first air interface protocol, the cell identifier configured for the second air interface protocol based on at least one of
a signalling procedure with one or more cells configured for the second air interface protocol, or
a signalling procedure with a centralized network entity for distributing cell-specific cell identifiers.

2. The method according to claim 1, comprising:
- determining, at the cell configured for the first air interface protocol, the resource allocation based on reserving resource elements for the generated cell reference signal; and
- transmitting, by the cell configured for the first air interface protocol, the generated cell reference signal on the reserved resource elements.

3. The method according to claim 2, comprising: rate-matching, at the cell configured for the first air interface protocol, user data to user equipment of the cell configured for the first air interface protocol to resource elements adjacent to the resource elements reserved for the generated cell reference signal.

4. The method according to claim 1, comprising:
- determining, at the cell configured for the first air interface protocol, the cell identifier configured for the second air interface protocol based on at least one of
  - a configuration determined by an Operations and Maintenance system; and
  - information of used cell identifiers by the one or more cells configured for the second air interface protocol.

5. The method according to claim 1, comprising:
- determining, at the cell configured for the first air interface protocol, the air interface resource allocation based on information indicating a cell reference signal allocation of at least one cell configured for the second air interface protocol.

6. The method according to claim 1, wherein the first air interface protocol is New Radio (NR) and the second air interface protocol is Long Term Evolution (LTE) and the cell identifier is Physical cell identifier for LTE.

7. An apparatus comprising:
- at least one processor; and
- at least one memory storing instructions that, when executed by the at least one processor, cause the apparatus to perform:
- generating, at a cell configured for a first air interface protocol, a reference signal based on a cell identifier for a second air interface protocol;
- determining, at the cell configured for the first air interface protocol, an air interface resource allocation for the first air interface protocol based on the cell identifier for the second air interface protocol;
- transmitting, by the cell configured for the first air interface protocol, the generated cell reference signal according to the determined air interface resource allocation; and
- determining, at the cell configured for the first air interface protocol, the cell identifier configured for the second air interface protocol based on at least one of
- a signalling procedure with one or more cells configured for the second air interface protocol, or
- a signalling procedure with a centralized network entity for distributing cell-specific cell identifiers.

8. The apparatus according to claim 7, wherein the at least one memory and instructions, when executed by the at least one processor, further cause the apparatus to perform:
- determining the resource allocation based on reserving resource elements for the generated cell reference signal; and
- transmitting the generated cell reference signal on the reserved resource elements.

9. The apparatus according to claim 8, wherein the at least one memory and instructions, when executed by the at least one processor, further cause the apparatus to perform rate-matching, at the cell configured for the first air interface protocol, user data to user equipment of the cell configured for the first air interface protocol to resource elements adjacent to the resource elements reserved for the generated cell reference signal.

10. The apparatus according to claim 7, wherein the at least one memory and instructions, when executed by the at least one processor, further cause the apparatus to perform: determining, at the cell configured for the first air interface protocol, the cell identifier configured for the second air interface protocol based on at least one of
- a configuration determined by an Operations and Maintenance system; and
- information of used cell identifiers by the one or more cells configured for the second air interface protocol.

11. The apparatus according to claim 7, wherein the at least one memory and instructions, when executed by the at least one processor, further cause the apparatus to perform determining, at the cell configured for the first air interface protocol, the air interface resource allocation based on information indicating a cell reference signal allocation of at least one cell configured for the second air interface protocol.

12. The apparatus according to claim 6, wherein the first air interface protocol comprises New Radio (NR) and the second air interface protocol comprises Long Term Evolution (LTE) and the cell identifier comprises a physical cell identifier for LTE.

13. A non-transitory computer readable medium comprising program instructions for causing an apparatus to perform at least the following:
- generate, at a cell configured for a first air interface protocol, a reference signal based on a cell identifier for a second air interface protocol;
- determine, at the cell configured for the first air interface protocol, an air interface resource allocation for the first air interface protocol based on the cell identifier for the second air interface protocol;
- transmit, by the cell configured for the first air interface protocol, the generated cell reference signal according to the determined air interface resource allocation; and
- determine, at the cell configured for the first air interface protocol, the cell identifier configured for the second air interface protocol based on at least one of
- a signalling procedure with one or more cells configured for the second air interface protocol, or
- a signalling procedure with a centralized network entity for distributing cell-specific cell identifiers.

\* \* \* \* \*